Oct. 15, 1935.   J. A. ANGLADA ET AL   2,017,197
VALVE PORT SEALING DEVICE
Filed Sept. 10, 1931   6 Sheets-Sheet 1
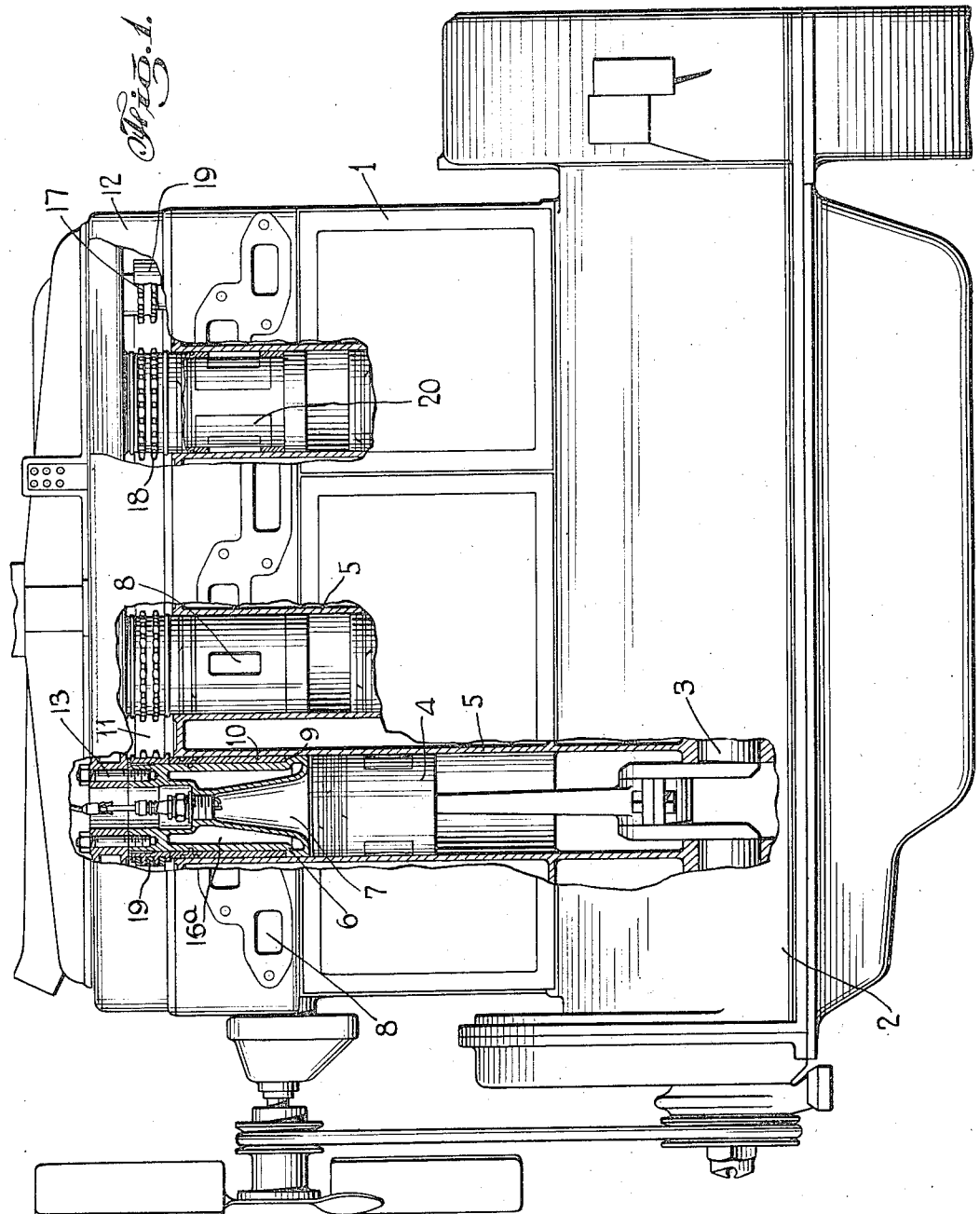
INVENTORS
JOSEPH A. ANGLADA
AXEL H. ASBROOTH
BY
ATTORNEYS Oct. 15, 1935.    J. A. ANGLADA ET AL    2,017,197
VALVE PORT SEALING DEVICE
Filed Sept. 10, 1931    6 Sheets-Sheet 2
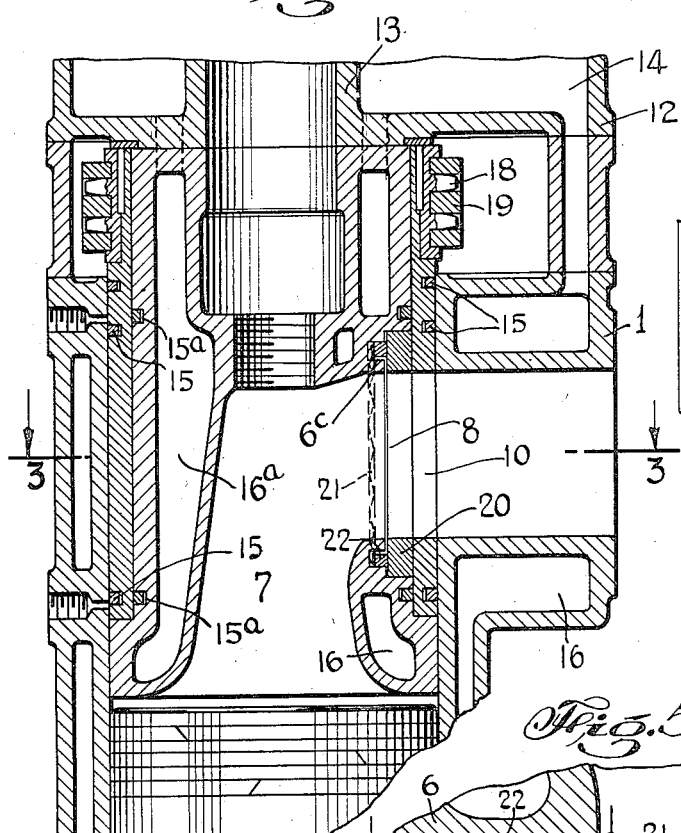
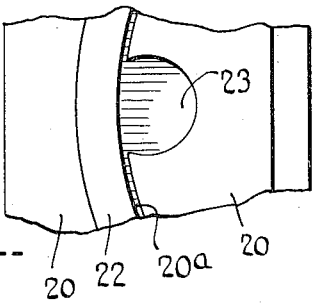
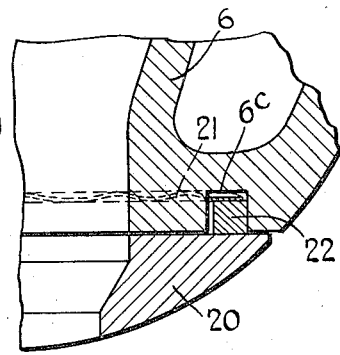
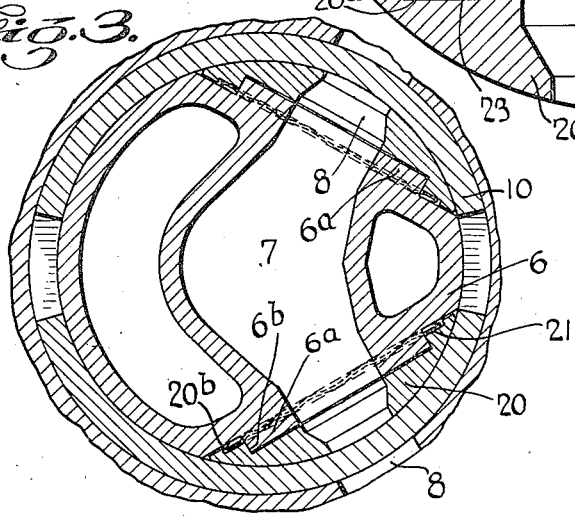
INVENTORS
JOSEPH A. ANGLADA
AXEL H. ASPROOTH
BY
ATTORNEYS

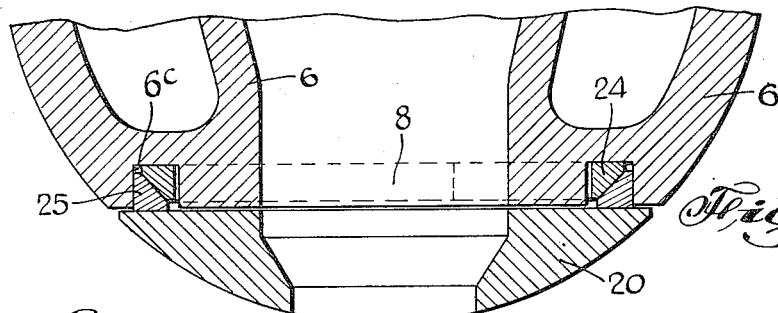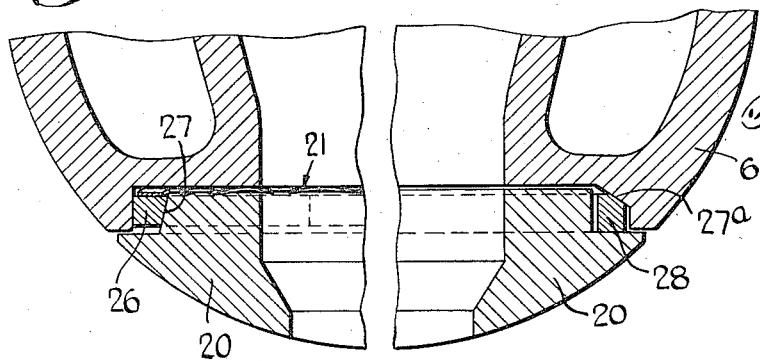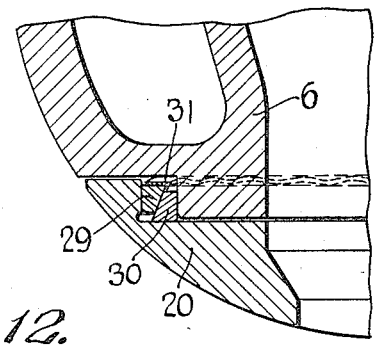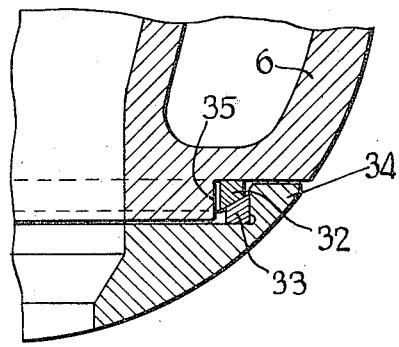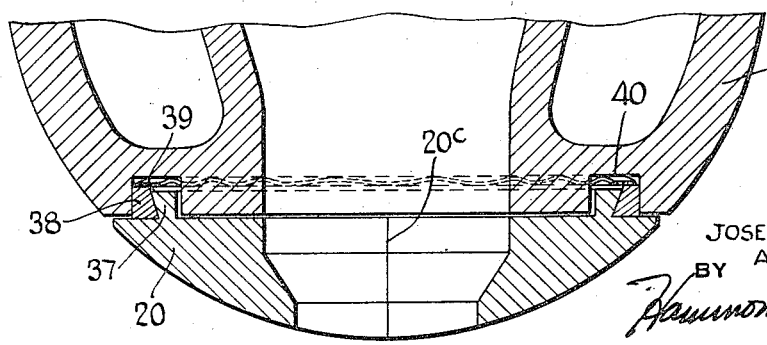

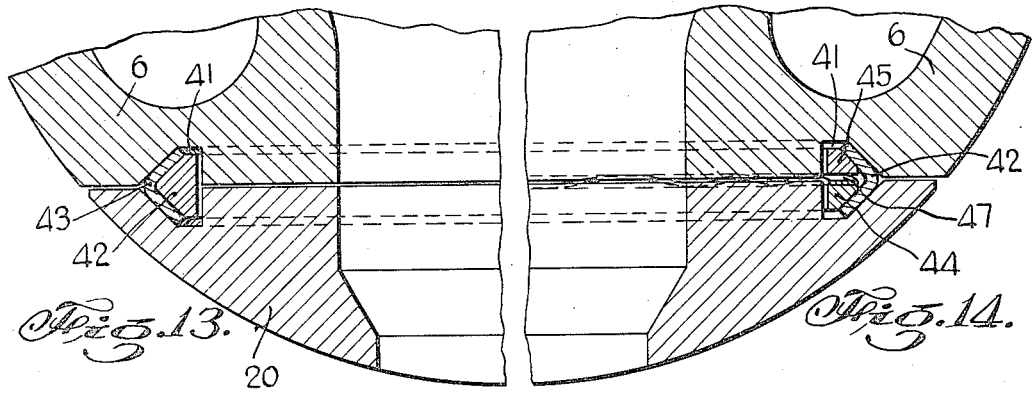
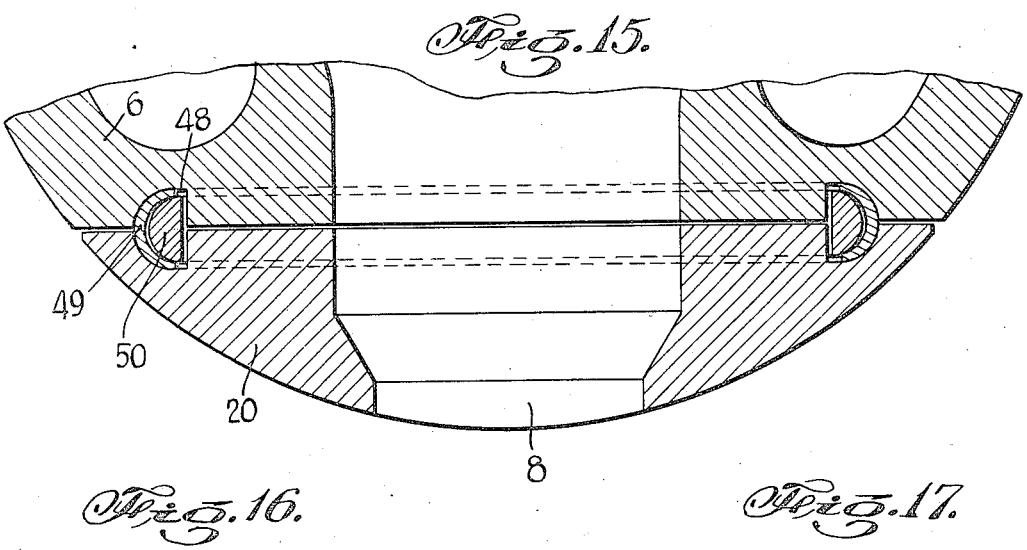
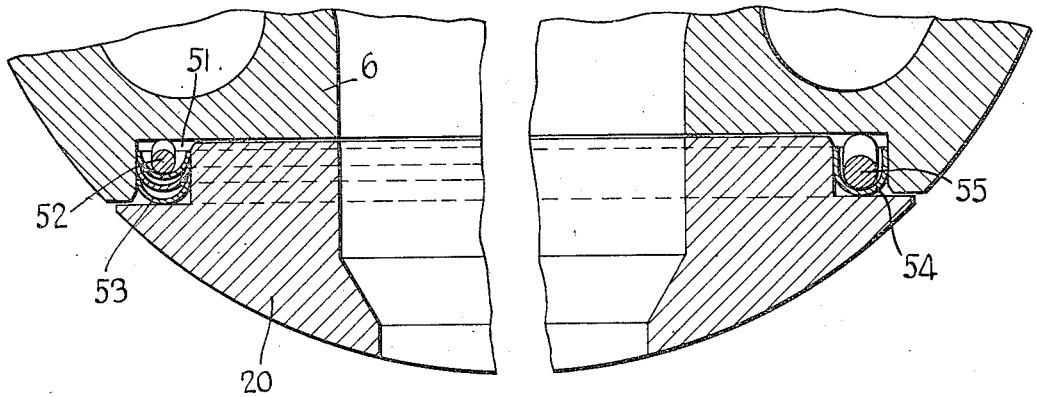

Oct. 15, 1935.  J. A. ANGLADA ET AL  2,017,197
VALVE PORT SEALING DEVICE
Filed Sept. 10, 1931     6 Sheets-Sheet 5

INVENTORS
JOSEPH A. ANGLADA
AXEL H. ASPROOTH
BY
ATTORNEYS

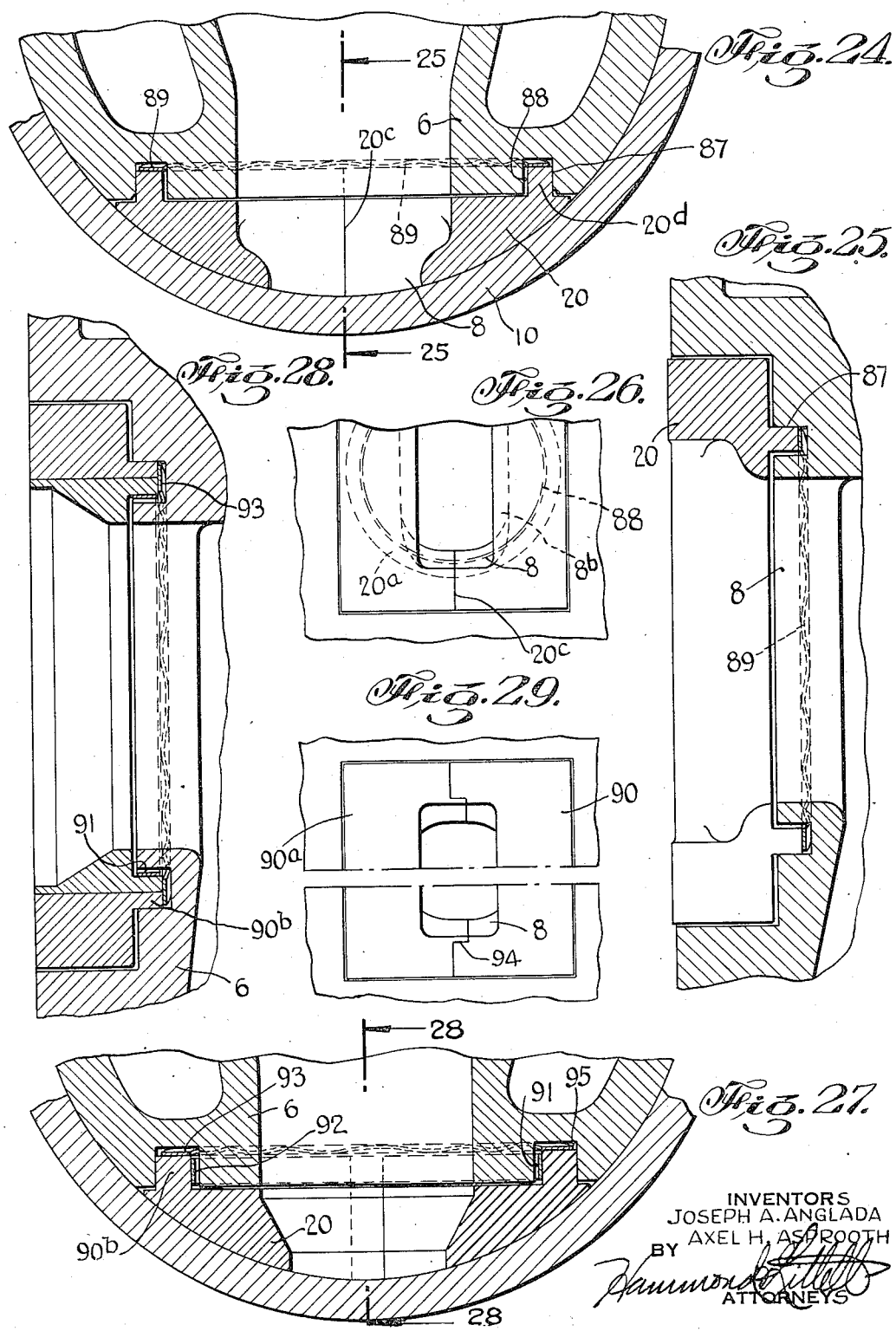

Patented Oct. 15, 1935

2,017,197

UNITED STATES PATENT OFFICE 2,017,197

VALVE PORT SEALING DEVICE

Joseph A. Anglada and Axel H. Asprooth, New York, N. Y., assignors to Anglada Motor Corporation, New York, N. Y., a corporation of Delaware Application September 10, 1931, Serial No. 562,007

19 Claims. (Cl. 123—59)

This invention relates to improvements for sealing sleeve valves against pressure loss through the valve ports and more particularly relates to improvements in the sealing device for sealing the valve ports of sleeve valve internal combustion engines against leakage. This invention is a device similar to that shown in our prior copending application Serial No. 533,604, filed April 29, 1931.

Internal combustion engines of the sleeve valve type and particularly of the short sleeve or cuff valve type have been somewhat inefficient in operation due to the difficulty of effectively sealing the combustion chamber against compression losses. To compensate for temperature changes and to reduce friction it is necessary to allow considerable clearance for the valve member operating in a particular pocket. If the clearance is reduced to provide a tighter seal in the valve chamber the friction increases and with the extreme changes of temperature causes binding of the valve member, and if the clearance is increased it has been impossible in the past to maintain a sufficient seal within the combustion chamber for efficient operation.

It is one of the principal objects of our invention to provide an effective sealing means around the ports of sleeve valve members as used in various types of mechanical constructions, including rotary sleeve valve internal combustion engines in which a movable shoe surrounding the ports cooperates with the valve member and is provided with means to urge the shoe against the valve, and means to prevent escape of pressure behind the shoe in such a manner that there is no pressure loss at the valve port and at the same time the friction of the moving valve is not materially increased.

Another object of this invention is to provide a sleeve valve internal combustion engine with a valve port sealing member adapted to contact with the valve and provided with an expanding sealing ring to provide an effective pressure seal against the valve without the necessity for securing the ring in position and without materially increasing the friction losses of the moving valve.

Another object of this invention is to provide an expanding ring sealing member cooperating with a slidable sealing shoe which will force the shoe against the adjacent valve sleeve to prevent leaks at the ports and will seal the ports against leaks behind the shoe.

Another object of this invention is to provide a wedge shaped expanding ring construction in conjunction with a movable shoe to seal the valve ports in a sleeve valve engine against pressure loss.

Another object of this invention is to provide an expanding ring construction cooperating with a movable shoe to force the shoe against a valve adjacent the ports thereof in such manner that pressure changes within the combustion chamber will tend to aid the sealing of the shoe against the valve and such that pressure will not leak or escape around the port.

Another object of the invention is to provide an improved valve port sealing shoe having a plurality of surface depressions to retain lubricant and also to reduce the surface contact area.

Another object of the invention is to provide a sealing shoe for valve ports which has a rectangular opening on one face cooperating with one of the ported members such as the valve sleeve and a circular or substantially circular opening of approximately the same area on the other face to reduce the necessary size of the surrounding sealing member or ring.

While some of the objects of the invention have been specifically enumerated to illustrate the applications of our invention, further objects and advantages of this invention will appear from the following description thereof taken in connection with the accompanying drawings which illustrate several preferred forms of embodiment of the device and in which:

Figure 1 is a side elevation partly in section of an internal combustion engine of the rotary cuff or sleeve valve type.

Figure 2 is a central vertical section showing in detail the internal construction of a part of the engine.

Figure 3 is a horizontal cross section through a part of one cylinder substantially on the center line of the valve port as indicated at 3—3 on Figure 2 and showing one form of sealing means.

Figure 4 is a partial horizontal section of a wide sector type shoe with a sealing ring carried in the cylinder head.

Figure 5 is a view similar to Figure 4 showing the sealing ring carried in the shoe.

Figure 6 is a horizontal sectional detail showing the picker opening for removal of the sealing rings and taken substantially on the line 6—6 of Figure 5.

Figures 7, 8, 9, 10, 11, and 12 are partial horizontal sections through the valve port, similar to Figure 3, showing different forms of beveled ring sealing constructions between the shoe and the engine head.

Figures 13, 14, 15, 16, and 17 are horizontal sections showing further modified forms of construction in which the sealing ring is triangular or semi-circular in shape and of either the single or double type, Figures 16 and 17 showing single and multiple sealing spring rings.

Figure 18:
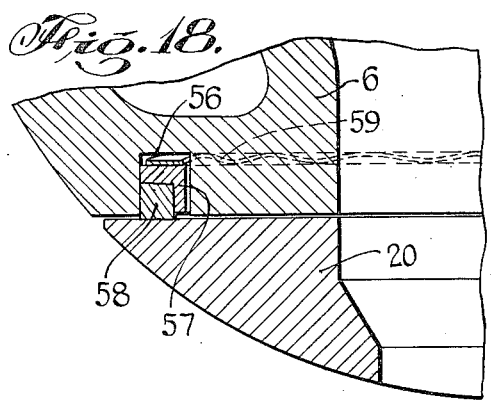
Figure 19:
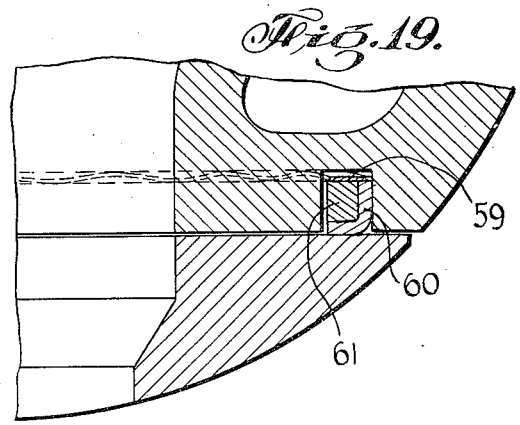

Figures 18 and 19 are similar horizontal sections showing angular sealing and packing rings.

Figure 20:
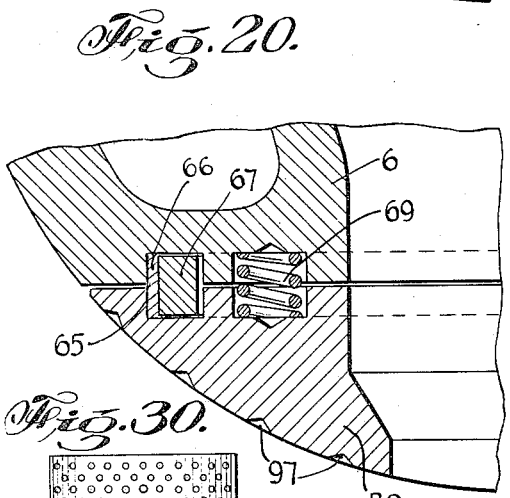
Figure 21:
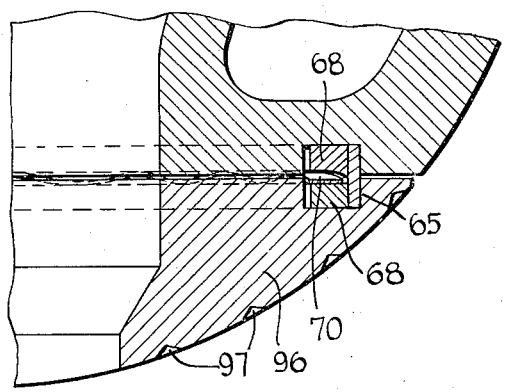

Figures 20 and 21 are partial horizontal sections showing cylinder shaped packing and sealing rings of either single or double type.

Figure 22:
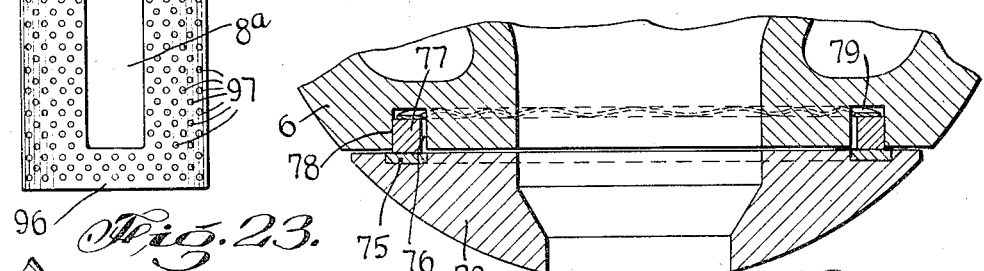
Figure 23:
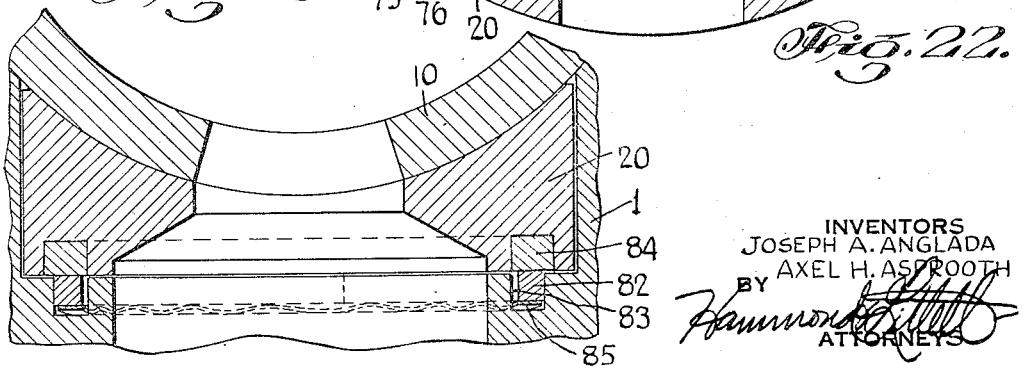

Figures 22 and 23 are horizontal sections showing further modified forms of sealing rings and cooperating cushions or packing in which the ring is mounted in the head or in the cylinder block and the packing is mounted in the shoe.

Figures 24, 25, and 26 are respectively partial horizontal, vertical and front elevational views of the wide sector type shoe in which the shoe and sealing ring are integral, Figure 25 being taken substantially on the line 25—25 of Figure 24.

Figures 27, 28 and 29 are respectively horizontal, vertical, and front elevational views of a modified form of construction in which the sealing shoe is in two halves, and in which the head is cut away to receive the sealing shoe, Figure 28 being taken substantially on the line 28—28 of Figure 27.

Figure 30:
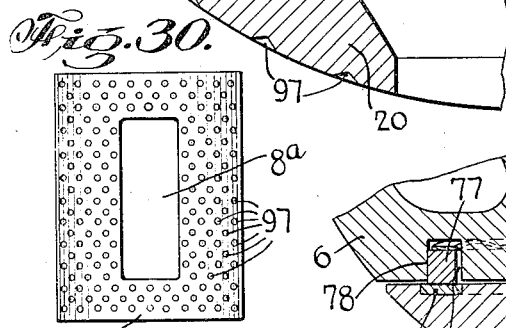

Figure 30 is a front elevation of an improved sealing shoe with lubricant receiving pockets.

The internal combustion engine particularly shown in Figure 1 to illustrate my invention consists of the usual cylinder block 1, crank case 2, containing the crank shaft 3, which operates with the pistons 4 in the cylinders 5 in the well known manner. A cylinder head 6 is inserted in the cylinders 5 and forms the combustion chamber 7. The cylinder head 6 has suitable ports 8 and is provided with the annular pocket or recess 9 in which the sleeve valve 10 is adapted to rotate. The sleeve valve 10 is of the short or cuff type and extends between the cylinder head 6 and cylinder walls 5 and is preferably driven from the valve top either by a chain or gears as desired. A valve gear drive chamber 11, is covered by the cylinder block cover 12. This construction of the engine and its mechanical advantages is described and claimed in the copending application of Joseph A. Anglada, Ser. No. 187,977, filed April 30, 1927, now Patent #1,839,458, granted January 5, 1932, and although a rotary valve engine has been particularly chosen to illustrate the invention the apparatus could be equally as well used on a reciprocating valve engine or with any other form of sleeve valve.

The cylinder block cover 12 is adapted to receive the cylinder head centering devices 13 and to thereby suspend the cylinder head 6 within the cylinder 5. The cylinder block cover 12 is secured to the cylinder block by suitable bolts (not shown) and is provided with cooperating water passages 14 (Figure 2) which connect the water jacket 16 of the cylinder block 1 and with the passages 16a surrounding the combustion chamber 7 and the valve 10, thus cooling the combustion chamber and cooling the valve on all sides. This construction is substantially similar to that shown in our copending application Ser. No. 533,604, previously referred to and is merely illustrative of one form of engine to which our sealing devices may be applied.

The valve sleeves 10 are provided with suitable gears 18 which may be chain driven by the chain 19 from a suitable drive shaft 17 thus maintaining the proper timing relation of each of the valve sleeves as is well known in connection with internal combustion engines. Inlet and exhaust ports 8 of the combustion chamber 7 are alternately opened and closed at proper periods for the cyclic operation of the engine, the combustion chamber 7 being effectively closed during the compression and explosion strokes of the pistons by the imperforate portions of the valve sleeve 10.

In order to seal the cylinders against leakage around the valve ports 8, sealing shoes 20, preferably segmental in shape are provided, which sealing shoes are curved on their outer periphery and are adapted to press against the valve sleeve 10 and are carried by the cylinder head 6 adjacent the ports 8 and surrounding the same.

As shown particularly in Figures 3 and 30, the shoes 20 are substantially rectangular in their vertical plane and are provided with a rectangular opening 8a corresponding to the port openings 8 in the valve sleeve and cylinder. In the horizontal plane the shoes 20 correspond to the sector of a circle, having the curvature of the valve sleeve on their outer face, and a substantially straight back wall. In some of the embodiments, particularly Figures 12, 24, 25, 27, etc., the shoes 20 are split at the line 20c below the port opening 8a and placed under tension, and are provided with integral sealing rings on the back thereof which may act as piston rings to provide a seal back of the shoes as hereinafter described.

Due to their reduced area with respect to the cylinder head 6, the friction of the sealing shoes 20 pressing against the valve sleeve is not very great and the power loss will be negligible. The valve member 10 may also carry rings 15 above and below the ports 8 if desired, and rings 15a may be provided on the heads 6. The sealing shoes 20 effectively seal around the ports 8 and prevent the escape of gases between the valve sleeve and the shoe by their pressure against the cuff valve sleeve 10, and escape of gases behind the shoes is prevented by means of the improved sealing rings hereinafter described.

In the form of embodiment of sealing ring shown in Figure 3, the sealing shoe 20 is preferably adapted to cooperate with the cylinder head 6 in such a manner that rotation of the shoe with the valve sleeve 10 will be prevented by the projections 6a on the head. One shoe 20 is shown adjacent each exhaust and inlet port although a single shoe could be used for both ports. The shoes are segment shaped to cooperate with the valve member and of greater width than the port itself. A flexible ring 21 which may be wavy or curved in shape is adapted to surround each port 8 and be inserted between the shoe 20 and the cylinder head 6, to resiliently press the shoe against the valve sleeve and stop any leaks at this point. To prevent leakage behind the shoe a labyrinth joint is provided between the shoe and the head consisting of the stepped shoulders 6b and 20b (Figure 3).

In Figures 2, 4, and 5, a slightly modified and preferred form of seal between the shoe and the head is shown in which a resilient substantially circular split spring ring 22, similar to a piston ring, fits within a slot or groove 6c in the cylinder head 6 and by its tendency to expand as a piston ring forces itself outward to maintain a pressure seal against the outer walls of the groove while a small wavy ring 21 is used to force the shoe 20 out and against the valve sleeve not shown. In Figure 5 the shoe 20 has a slot 20a in which a similar spring sealing ring 22 fits and is in tension contact with the sides thereof while a crinkled spring ring 21 is used to force the ring and shoe apart and press the ring against the cylinder head 6. In each of the embodiments of Figures 4 and 5 the sealing shoe is resiliently forced against the valve sleeve and as the shoe is spaced from the cylinder head, an effective area is opened to combustion chamber pressure to additionally force the valve shoes against the valve member to prevent leaks. By properly proportioning the surfaces, varied tension due to internal pressure may be had on the sealing shoe with respect to tension of the valve member in addition to the wavy ring 21.

When the sealing ring is inserted within a suitable groove or channel either in the cylinder head or the sealing shoe, it is desirable to provide some enlarged openings such as 23 particularly shown in Figures 5 and 6. The opening 23 facilitates the insertion of a suitable tool under the ring 22 so that it may be lifted out of the channel 20a. Several such openings at spaced points may be used.

In the forms of construction shown in Figures 7 to 12 the sealing shoes 20 have one or more spring rings 24—25 etc., having tapered sides in which the expansion of the rings tends to seal the openings between the cylinder head and the shoe as well as to force the sealing shoe against the valve. As shown in Figure 7, a pair of resilient spring rings 24 and 25 are provided with beveled faces cooperating to project the sealing shoe 20 against the valve and away from the cylinder head 6 while the ring 25 presses outwardly against the walls of the groove 6c to prevent escape of gases around the groove. These rings 24 and 25 are carried in the head 6 although they could similarly be carried in the shoe. In Figure 8, the beveled ring 26 cooperates with the bevel 27 on the shoe 20 and the wavy spring ring 21 to force the sealing shoe 20 outward toward the valve sleeve and to seal the head with reference to the shoe.

In Figure 9, the cylinder head 6 is provided with a partially beveled surface 27a against which the beveled ring 28 cooperates, so that the compression and explosion pressures in the cylinder will cause the ring 28 to expand and will tend to slide the ring 28 on the bevel 27a, and similarly force the shoe 20 outward toward the valve sleeve thus improving the seal at all points.

In Figure 10, a pair of beveled rings 29 and 30 having cooperating surfaces produce a sliding pressure forcing the shoe 20 outward. The ring 30 is pressed against the ring 29 by its own resilience while the additional resilience of the wavy ring 31 also acts to force the shoe outwardly. In this form the rings are mounted partly in the shoe 20 and partly in the cylinder head 6, whereas in Figure 7, the rings are both mounted within a suitable groove or channel in the cylinder head 6.

In Figure 11, the rings 32 and 33 are tapered on a substantially horizontal plane and no additional crinkle rings are necessary. In both Figures 10 and 11, the shoe 20 is provided with an angular projection 34 which cooperates with the angular projection 35 on the head 6 to form the necessary slot for the rings.

In Figure 12, the shoe 20 is split at 20c and is provided with an integral ring projection 37 and is heat treated so as to cause it to expand outwardly, and an expansible beveled ring 38 cooperates with the projection 37 to provide a seal against pressure leaks behind the shoe 20 while the shoe is forced outward from the head by the crinkle spring 39. Both the integral projections 37 and the ring 38 are carried within a suitable slot 40 in the cylinder head 6 and due to the continuous contact of the beveled ring 38 and the integral projection 37, the parts are pressure sealed.

In these Figures 7 to 12, heretofore described, the sealing ring is at all times in contact not only with the member by which it is carried but also by the cooperating adjacent member. Such contact insures against leaks between the sealing shoe and the cylinder head and as the shoe is resiliently forced against the valve sleeve, there can be no leaks at that point.

In these particular figures, the rings are beveled in such a manner that their own natural expansion will either force the shoe outward or cooperate to close the space between the cylinder head and sealing shoe, or to do both especially as shown in Figure 9. Either one or more rings may cooperatively be used and they may be carried in suitable channels either in the head or in the shoe, or partly in both. Additional wavy tension rings may be used if desired.

Figures 13 and 14 illustrate an embodiment in which the cylinder head 6 is provided with a suitable beveled channel or groove 41. In Figure 13 a single V shaped spring ring 42 cooperates with a packing 43 to force the shoe 20 away from the head 6 and to effectively seal the opening which will be formed between the shoe 20 and the head 6 due to such expansion. The packing 43 may be of any suitable fibrous material such as asbestos or fireproofed fabric or leather, or of sheet metal.

In Figure 14 a similar packing 42 is used but a plurality of spring rings 44 and 45 are used, which rings have a similar V shape. A wavy ring 47 tends to separate the rings 44 and 45 and to expand the packing in a lateral direction. Suitable channels or grooves 41 are formed partly in the head and partly in the shoe to receive this sealing means.

In Figure 15 the cylinder head 6 and shoe 20 have a semi-circular cross section groove 48 to receive a semi-circular or crescent shaped packing 49 which is forced outward by an expanding ring 50 which is semi-circular in cross section. As such ring expands it tends to press outwardly and the resultant pressure on the shoe 20 is away from the cylinder head 6 thus effectively sealing the port 8.

In Figures 16 and 17 a channel 51 is provided between the cylinder head 6 and the shoe 20 and in Figure 16 a single crinkled or wavy ring 52 with a plurality of semi-circular metallic spring packings 53 tends to force the shoe outward and to seal the channel 51. In Figure 17, a single sealing spring 54 and a crinkled ring 55 are provided for this purpose. The packings 53 and 54 are resilient and of substantial U shape or crescent shape and thereby completely seal the port.

Figures 18 and 19 show a channel 56 in the cylinder head 6 and in Figure 18, an L shaped ring 57 is provided which cooperates with the packing 58, the additional wavy ring 59 tending to push the shoe toward the valve sleeve. The packing may be square in cross section and will fit tight against the shoe 20. In Figure 19, the position of the parts is reversed and the packing 60 is L shaped and the ring 61 is substantially square. A wavy spring 59 may similarly be used however to force the shoe outwardly against the valve sleeve.

A slightly different form of embodiment of the sealing means is shown in Figures 20 and 21 in which a cylindrical shaped packing 65 is inserted within a channel 66 formed partly in the shoe 20 and partly in the head 6. Either a single spring ring 67 as shown in Figure 20 may be used to expand the packing against the channel or a plurality of rings 68 may be used as shown in Figure 21. In Figure 20 coil springs 69 are placed between the cylinder head 6 and the shoe 20 to tension the shoe against the valve sleeve not shown in this figure. In Figure 21, a wavy ring 70 may be used which may be placed between the double rings 68 in such manner that the shoe 20 will also be tensioned away from the cylinder head.

In Figure 22, a packing 75 is placed within a suitable channel 76 in the shoe with a ring 77 expanding against the abutment 78 in the cylinder head 6. The expanding ring 77 contacts with the packing 75 which acts as a cushion and is forced against the packing by means of a wavy ring 79 or similar tension device.

In Figure 23, the sealing shoe 20 is shown carried by the cylinder block 1 and contacting with the valve sleeve 10 on the exterior thereof. The shoe is similarly adapted to be tensioned against the valve sleeve and means are provided to seal against leakage behind the shoe. Any of the preceding forms of construction may be used for such purpose. As particularly shown, however, an expanding ring 82 is mounted within the cylinder block 1 in a suitable channel 83 and is tensioned against the packing 84 in the sealing shoe by the wavy ring 85 although it is obvious that other means may be used.

As shown in Figures 24, 25 and 26, the wide sector type shoe split at 20c is provided with an integral sealing ring 20d which may readily be formed on the shoe and which due to the split formation of the shoe 20 will suitably contact in tension with the sides 87 of the channel 88 in the cylinder head 6. A wavy ring 89 is provided to tension the shoe 20 against the valve sleeve 10. In this construction, it will be noted that the valve port 8 is rectangular in cross section and rapidly changes to a substantially circular opening 8b. The circular opening permits the use of a much smaller ring size 20d than would be possible with the elongated opening and by properly proportioning the sides of the ports the area remains constant although there is the change of shape of the port opening. It is also possible with such construction to provide improved valve ports in the valve sleeve which are preferably rectangular in shape.

In Figures 27, 28, and 29 a similar form of sealing shoe is shown in which the sealing shoe is divided in halves 90 and 90a and is similarly provided with an integral projection 90b contacting with the channel 95 in the cylinder head 6. As the shoe is in halves, a supplementary wavy ring 92 is provided to expand the projection 90b and maintain the contact of the projections with the cylinder head channel 95. A suitable wavy ring 93 is provided to tension the shoe 20 against the valve 10. In such construction, a suitable zig-zag 94 is provided for interlocking the parts of the shoe to prevent leaks at the joints.

A further modified embodiment of the sealing shoe is shown in Figures 20, 21 and 30 in which the surface 96 contacting with the valve sleeve is provided with a plurality of depressions 97 substantially covering the surface. These depressions serve two purposes, namely, to reduce the surface contact area and thus reduce power loss due to friction, and secondly, to act as reservoirs for lubricant. Such a sealing shoe may be formed in any of the preceding modifications of construction if desired, and either on an internal surface of segment, as shown in Figure 23 or on the external surface as shown in Figure 22.

While we have shown several forms of sealing device in which our invention may be embodied, it should be understood that the invention comprises broadly the use of a sealing shoe surrounding the port opening of a rotary sleeve valve, more particularly a rotary sleeve valve internal combustion engine in which means are provided for pressing the face of the shoe resiliently against the sleeve, and resilient means are provided for sealing against the escape of pressure between the shoe and its supporting member.

It will be noted in particular that in all of the embodiments shown a resilient or spring means is used to press the shoe against the sleeve and a resilient or spring means, usually of the piston ring type, is used to provide a seal behind the shoe, and that in all of the embodiments the means for pressing the shoe against the sleeve and for maintaining the seal behind the shoe may be slipped into position and are retained therein by their own shape and resiliency, and that no welding, brazing, or other locking means is used in providing the seals described.

It will thus be seen that a new form of valve seal has been provided which is particularly adapted for use with a rotary sleeve valve internal combustion engine, although the invention is not restricted thereto as the seal may be effectively used in other forms of fluid valves. In internal combustion engines, however, it is particularly effective due to the extreme changes of pressure which must be prevented from escaping from the combustion chamber to provide efficient operation. It is effectively used both internally or externally or both externally and internally of the valve sleeve and by suitably proportioning the areas between the sealing shoe and the ported member it is possible to obtain effective increases of the tension of the sealing shoe against the ported member due to increases in compression pressure or on change of suction in case of use with a vacuum.

Although particular embodiments show a shoe contacting with, and adjacent to each valve port, this is not the only manner in which such sealing can be accomplished. The sides of the sealing shoe should preferably be greater than the width of the open port to provide complete sealing and expanding rings similar to piston rings are preferably used to prevent leaks. Other tensioning means may be provided for tensioning the valve shoe against the valve sleeve.

Various modified forms of expanding rings may be used and they may be integrally formed or otherwise secured to the shoe or cylinder head to prevent pressure leaks. Other modifications may also be made within the scope and spirit of this invention and it is therefore desired that the description herein and the claims appended hereinafter be considered illustrative of the extent and not limiting the scope of the invention.

We claim:

1. In a valve port sealing means of the class described, a ported member, a valve member, a port sealing shoe cooperating with said valve member, and ring means carried by one of said members for sealing said shoe and said ported member against leaks, means to tension said sealing shoe against said valve member, said ring means being mounted between said shoe and said ported member, said ring means being expansible and sealing against pressure leaks on the face thereof.

2. A valve port sealing means for rotary sleeve valve internal combustion engines having a cylinder, a cylinder head, and a sleeve valve rotating between the cylinder and cylinder head, corresponding port openings in said cylinder and cylinder head, and means to prevent leakage around said port openings, comprising a sealing shoe carried by the head and surrounding said port openings, means to force said shoe against the valve sleeve during a complete engine cycle, and a sealing ring between said shoe and the head to prevent escape of pressure around said port openings, said ring being carried by the head and in gas tight contact with the shoe in all operative positions thereof.

3. In a rotary sleeve valve internal combustion engine, having a cylinder, a cylinder head and a valve sleeve rotating between the cylinder and head, corresponding port openings in said cylinder and head, controlled by said valve and means to prevent leakage around said port openings, comprising a sealing shoe mounted on said head and surrounding said port openings, means to press said shoe against the valve sleeve under sufficient pressure to maintain contact during compression and intake to prevent leakage between the shoe and the valve sleeve, and resilient sealing ring means to prevent gas leakage between the shoe and the head, said means maintaining sliding contact with one of said members to preserve the gas seal.

4. In a rotary sleeve valve internal combustion engine, having a cylinder, a cylinder head and a valve sleeve rotating between the cylinder and head, corresponding port openings in said cylinder and head, controlled by said valve and means to prevent leakage around said port openings, comprising a sealing shoe mounted on said head and surrounding said port openings, means to press said shoe against the valve sleeve to prevent leakage between the shoe and the valve sleeve, a groove in said head, and means to prevent leakage between the shoe and the head comprising a spring sealing ring carried in said groove and in sliding contact with one face thereof and in continuous contact with the shoe.

5. In a rotary sleeve valve internal combustion engine, having a cylinder, a cylinder head and a valve sleeve rotating between the cylinder and head, corresponding port openings in said cylinder and head, controlled by said valve and means to prevent leakage around said port openings, comprising a sealing shoe mounted on said head and surrounding said port openings, means to press said shoe against the valve sleeve to prevent leakage between the shoe and the valve sleeve, means to permit compression and explosion pressures to enter behind said shoe, a groove formed by projections on said head and said shoe, and means to prevent leakage between the shoe and the head comprising a spring sealing ring mounted in said groove said ring being held in contact with one part of the groove and slidably contacting with another part of the groove.

6. In a rotary sleeve valve internal combustion engine, having an outer cylinder, an inner cylinder and a valve sleeve rotating between the outer cylinder and inner cylinder, corresponding port openings in said outer cylinder and inner cylinder, controlled by said valve and means to prevent leakage around said port openings, comprising a sealing shoe mounted on said inner cylinder and surrounding said port openings, means to press said shoe against the valve sleeve to prevent leakage between the shoe and the valve sleeve, means to permit compression and explosion pressures to enter behind said shoe, a groove formed partly by the inner cylinder and partly by the shoe, and means to prevent leakage between the shoe and the inner cylinder comprising a spring sealing ring and a packing co-acting therewith, said ring and packing being carried in said groove, said ring tending to expand said groove and forcing the packing into said expanded groove.

7. In a sealing device for rotary valve ports a rotary valve having ports therein, a cooperating stationary valve member having ports therein and means to seal said ports against leakage, comprising a shoe mounted on the stationary member and surrounding said ports, a groove between said shoe and said stationary member, a spring behind said shoe resiliently urging the shoe against said rotary valve member, and a spring ring pressing laterally against one side of said groove, both said spring and ring being carried in said groove and mutually contacting with each other.

8. In a sealing device for rotary valve ports a rotary valve having ports therein, a cooperating stationary valve member having ports therein and means to seal said ports against leakage, comprising a shoe member mounted on the stationary member surrounding said ports, means behind said shoe member resiliently urging the shoe member against said rotary valve and creating a space between the stationary member and shoe member, and sealing means to seal the space between said stationary member and said shoe member and prevent gas leakage comprising a spring ring resiliently pressing against one of said members and a packing between said spring ring and the other member.

9. In an internal combustion engine of the class described a cylinder, a cylinder head forming a combustion chamber therein, a rotary valve mounted between said cylinder and head and having valve ports therein, said cylinder and head having cooperating valve ports, and means to seal said valve ports, comprising a shoe cooperating with said valve and surrounding said cylinder head port, and a spring between said shoe and said cylinder head, forcing said shoe in pressure tight relation against said valve and spacing said shoe from said head, and a ring seal between said shoe and said cylinder head, said seal including a plurality of expanding rings in contact with each other and normally sealing the space between said shoe and head.

10. In an internal combustion engine of the class described a cylinder, a cylinder head forming a combustion chamber therein, a rotary valve mounted in said cylinder and having valve ports therein, said cylinder and head having cooperating valve ports, and means to seal said valve ports, comprising a shoe cooperating with said valve and surrounding said cylinder head ports, a plurality of angularly shaped spring rings between said shoe and said cylinder head in cooperative position forcing said shoe in pressure tight relation against said valve, and sealing between said shoe and head respectively, and means to introduce pressure from said combustion chamber between said head and shoe to additionally increase the pressure of said shoe against said valve, said spring means compensating for wear and normally preventing return of the shoe.

11. An internal combustion engine of the class described having a removable upper portion containing a rotary valve and a cylinder head adjacent said valve having a valve port therein, the combination of a sealing shoe surrounding the valve port and carried by said cylinder head, a spring ring between said sealing shoe and said cylinder head and sealing the space therebetween and additional spring means forcing said sealing shoe against said valve to prevent gas leaks and to permit an increase of clearance between said cylinder head and said valve.

12. In an internal combustion engine of the class described the combination of a cylinder head having a port therein, a rotary valve sleeve, a sealing shoe contacting with said sleeve, spring ring receiving grooves in said head and said shoe surrounding said valve port, a plurality of V-shaped spring rings in said groove and a wavy spring ring carried in said grooves between said V-shaped rings forcing said shoe against said valve and preventing the loss of gas pressure between said head and said sealing shoe.

13. In an internal combustion engine of the class described the combination of a cylinder head, a rotary valve sleeve having a port therein, a sealing shoe movable into contact with said valve sleeve, spring ring receiving grooves in said head and said shoe surrounding said valve port, spring rings having offset faces carried in said grooves, said offset faces cooperating to force the shoe against the valve and to prevent escape of pressure behind the shoe, other faces of said rings contacting in gas tight relation with the groove and with the sealing shoe.

14. In an internal combustion engine of the class described the combination of a cylinder head, a rotary valve having a port therein, a sealing shoe contacting with said valve, an annular channel in said head and surrounding said valve port, an integral projection on said sealing shoe extending into said annular groove, the projection on said sealing shoe being under circumferential and radial pressure with respect to said head to prevent escape of gases through said port.

15. In an internal combustion engine of the class described the combination of a cylinder head, a valve sleeve having a port therein, a concave sealing shoe contacting with said valve sleeve, means to support said sealing shoe, and an expanding ring mounted between said supporting means and said sealing shoe to force said sealing shoe under tension against said valve sleeve and to pressure seal said sealing shoe with respect to said supporting means.

16. In a valve port sealing means of the class described a ported member, a valve member, a port sealing shoe cooperating with said valve member, ring means for sealing said shoe and said ported member against leaks, and a resilient packing adjacent said ring means for cushioning said sealing shoe with respect to said valve member.

17. In a valve sealing means for rotary valves, a rotary valve having a port opening, a ported member controlled by said valve, a valve shoe on said ported member, means to resiliently press the valve shoe against the valve to prevent loss of pressure between the valve and the valve shoe, a means to seal against fluid leakage between the valve shoe and ported member, including a restricted channel between the valve shoe and ported member, and an expanding ring in said channel in contact on one face with one part of the channel and contacting with the other member.

18. In a sealing device for rotary valve ports, a rotary valve having ports therein, a cooperating stationary valve member having ports therein and means to seal said ports against leakage, comprising a shoe mounted on the stationary member and surrounding said ports, means to press said shoe against the valve under sufficient pressure to maintain contact during compression and intake to prevent leakage between the shoe and the valve, and resilient sealing ring means to prevent gas leakage between the shoe and the stationary member, said means maintaining sliding contact with one of said members to preserve the gas seal.

19. A valve port sealing device for a rotary sleeve valve internal combustion engine having a combustion chamber, a fixed ported valve member and a rotary ported sleeve valve to control the intake to and exhaust from said combustion chamber, and means to seal said ports against pressure loss including a movable member contacting with the valve, means to seal said movable member against pressure loss with respect to said fixed valve member, said means including a resilient member in slidable contact with said movable member, and means to protect said resilient member against heat loss including a relatively thick wall between the heated gas in the valve ports and the resilient member.

JOSEPH A. ANGLADA.
AXEL H. ASPROOTH.